Figure 1:
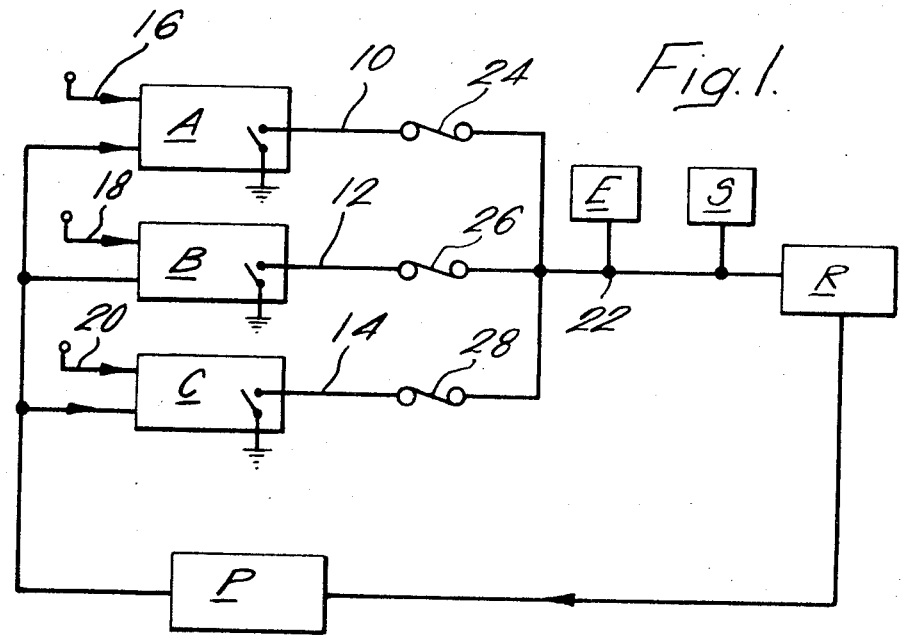

United States Patent [19]
McLeod

[11] 3,745,418
[45] July 10, 1973

[54] CONTROL OF OPERATION OF A SYSTEM
[75] Inventor: Norman William McLeod, Glen Iris, Australia
[73] Assignee: The Commonwealth of Australia, Melbourne, Victoria, Australia
[22] Filed: July 28, 1971
[21] Appl. No.: 166,819

[30] Foreign Application Priority Data
July 30, 1970 Australia.................................. 2035

[52] U.S. Cl...... 317/40 A, 179/175.3, 179/175.2 R, 324/51, 317/60, 317/33 R
[51] Int. Cl. ............................................. H02h 5/04
[58] Field of Search .............. 179/175.2 C, 175.2 R, 179/15 BF, 175.3; 317/40 A, 46, 26, 60, 33 R; 340/253 Z; 324/51

[56] References Cited
UNITED STATES PATENTS
2,920,241   1/1960   Jacobs.............................. 317/40 A Primary Examiner—J. D. Miller
Assistant Examiner—Harvey Fendelman
Attorney—Woodhams, Blanchard & Flynn

[57] ABSTRACT

A system comprising a plurality of signal paths each of which has an operative condition in which it can carry a signal and an inoperative condition in which it cannot, and a control which is normally capable of placing each or any of said paths in the inoperative condition, there being a fuse in each path and the control being above to ensure that a current sufficient to blow the fuse will flow on any path which is in its operative condition when it ought to be in the inoperative condition.

10 Claims, 2 Drawing Figures

PATENTED JUL 10 1973 3,745,418

CONTROL OF OPERATION OF A SYSTEM

The present invention relates to apparatus and a method for use in control of the operation of a system comprising a plurality of conditionable signal paths.

In signalling systems it is frequently desired to feed signals from several sources to a common signal receiver such that the signals from the various sources can be distinguished. Even where the signals themselves have the same form, this can be effected by feeding signals from the different sources along a common input highway to the receiver. One method of operating such a system is to connect the signal sources to the common highway by respective conditionable signal paths, and to control the conditions of the paths such that, given normal operation, a signal from only one, known source at a time can appear on the data highway. In this case, it may be convenient to arrange the system so that adoption of a signal transfer condition by a path is dependent on the source and on a controller, but once the necessary conditions have been satisfied, adoption of the signal transfer condition automatically causes a signal to appear on the data highway. In this case, however, if a fault occurs so that one path is permanently in the signal transfer condition, a fault signal appears on the highway, and desired signals from other sources cannot be transferred.

The present invention therefore provides a method and apparatus for use in control of operation of a system which includes a plurality of signal paths each having a first condition which permits the path to carry a normal signal and a second condition which does not permit it to carry such a signal, the paths being such that in normal use they can be placed in their second conditions by a control, said apparatus comprising disabling means which can be operated when all controllable paths have been placed in their second conditions by the control to render any path still in its first condition at least temporarily incapable of carrying said normal signal.

Each path may be capable of carrying a disabling signal when in its first condition and incapable of carrying such a signal when in its second condition and the disabling means may comprise means operable in use to cause any path in its first condition to carry the disabling signal, and a plurality of means associated with respective paths and each responsive to presence of the disabling signal on the associated path to render that path at least temporarily incapable of transferring said normal signal.

The invention also provides a corresponding method for use in control of operation of a system, and a system comprising apparatus as defined above.

The apparatus may include means to sense a fault condition of the system such that control of one of the paths has been lost with that path in its first condition, the means operable to cause a path to carry the disabling signal being operable in response to sensing of such a fault.

In an electrical system, the means associated with respective paths may be a plurality of fuses, one in each path, and the disabling signal may comprise a current flow sufficient to blow the fuses.

Arrangements may be made to inhibit application of the disabling signal to the paths while any one of them is legitimately in the first condition.

The plurality of paths may each join with a common path which may lead to a normal signal detector.

The arrangement may be such that adoption of the first condition by any one of the paths automatically causes the normal signal to appear on that path. The means to detect the fault condition may then comprise means to cause all controllable paths to adopt their second conditions and to detect the presence of the normal signal on a faulty path while all the controllable paths are in their second conditions.

Arrangements may be made to locate a faulty path rendered incapable of signal transfer. For instance, test signals may be applied successively to the paths, each path being ordered into its first condition by the control when the test signal is applied thereto so that the test signal will be detected on the controllable paths but not on a path rendered incapable of signal transfer.

Figure 2:
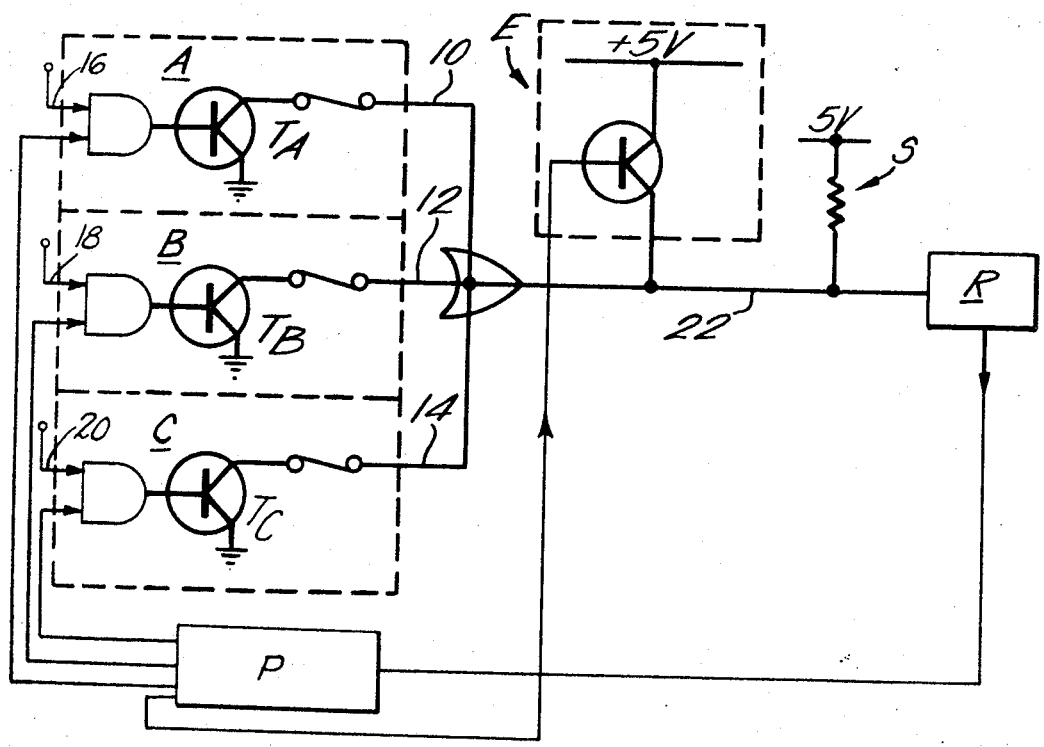

By way of example, one form of apparatus in accordance with the invention will now be described with reference to the accompanying drawings, in which:

FIG. 1 is a diagram of a portion of an electrical system incorporating apparatus in accordance with the invention, and FIG. 2 is a detail diagram of a particular form of apparatus for use in the system of FIG. 1.

The system partly illustrated in FIG. 1 might be used for scanning telephone links to determine their conditions and this use will be assumed in the following description. It will be understood however that essentially the same system could be used for many other purposes. The system comprises a plurality of signal paths, three of which are indicated by respective numerals 10, 12 and 14. Each path has an input from its respective link, the inputs to paths 10, 12 and 14 being indicated at 16, 18 and 20 respectively. Each path also has an input from a processor P which is arranged to control operation of the system. The link inputs and the processor inputs are associated with their respective paths by way of gating devices, indicated at A, B and C respectively for lines 10, 12 and 14, so that a signal only appears on a path when there is a signal on both inputs to it. In the illustrated arrangement, each gating device is arranged to place an earth (i.e., ground) on its respective path by closure of a switch when it has a signal on both inputs. Each path is connected to a data highway 22 which has a current source S connected to it so that a signal (current flow) appears on the highway and on a path which has been earthed. Such a signal will be detected by a receiver R which is coupled with the processor P.

In normal use processor P is arranged to supply signals to the gating devices in a cyclic sequence such that only one device can be "turned on" at a time. If a gating device is receiving a signal from its link at the same time as it receives a signal from the processor, the appropriate switch will be closed and the resultant signal on data highway 22 will be passed by receiver R to the processor P. Therefore in the event of a fault such that any of the paths is permanently earthed, unless suitable protective devices are incorporated in the system, highway 22 will permanently carry a fault signal. Besides the fact that this may cause malfunction of further parts of the system due to false information, it will be noted that a normal signal cannot be transferred by any of the other paths because the data highway is monopolised by the fault path.

In order to deal with this possibility, each path is provided with a fuse, those for lines 10, 12 and 14 being indicated at 24, 26 and 28 respectively. Periodically during its scanning cycle the processor is arranged to produce a null period in which signals are not supplied to any of the gating devices so that no signal should appear on the data highway. If at this time the data highway is carrying a signal, the signal is passed by the receiver and is detected by the processor. The latter thereupon activates a device, conveniently called "the executioner" and indicated in block E in the diagram. Upon activation, the executioner is arranged to supply a current to the data highway sufficient to blow any of the fuses. This current will not be able to flow on any signal path which is still under the control of the processor, because the appropriate gate will be turned off. The current will flow on the fault path however and will blow the fuse in that path so that the system is cleared to transmit signals via the remaining paths.

FIG. 2 illustrates a simple implementation of the apparatus illustrated in FIG. 1. In FIG. 2, $T_A$, $T_B$ and $T_C$ indicate output transistors of the gating devices A, B and C respectively. In each case, the emitter of the output transistor is earthed and the collector is connected to the corresponding signal path 10, 12 or 14. The gating device can be turned on by application of a signal to the base of its output transistor thereby providing a low resistance current path through the transistor to earth. Source S is represented by a 5V supply feeding highway 22 via a resistor which limits the current of the normal signal. The executioner is provided by a single transistor connected between the data highway and a 5V supply.

In use, prior to turning on of a gating device the data highway will normally be "high" (i.e., at high potential) because none of the signal paths will be earthed. When one of the gating devices is turned on, earthing of the data highway causes a current flow from source S which causes the highway to go low (i.e., to a low potential); this is detected by receiver R. If a fault is detected on any of the signal paths, the executioner is activated by a supply of a signal to the base of its transistor to cause a current to flow on the fault path. Since the resistance of the current path through the executioner is much less than that of the source resistor R, this current flow is high enough to blow the fuse in the fault path. Since the voltage applied by the executioner to the other paths is no higher than the source voltage however, these other paths will not be affected.

The faulty path may be located by the processor by feeding inputs to each path in turn to turn on the associated gating device. The controllable paths will respond in the expected manner by producing a signal on the data highway, but the fault path will not produce a signal on the highway and the processor will acknowledge this and print out appropriate information.

The invention is not limited to details of the illustrated embodiments. The signal paths and the data highway have been indicated by single lines in the diagram. It will be understood however that the physical realisation of each path will depend upon the form of signals to be transferred. The normal and disabling signals may take any desired form, and the executioner, source and receiver can be suitably designed to produce the required signals.

One example of use of the invention in a telephone system was given in a paper entitled "Complimentary Data Line Receiver and Driver Circuits" and presented by the inventor at an International Conference on Micro-electronic Circuits and System Theory at the University of New South Wales [Aug. 18–21 1970]. The paper will be published in the Proceedings of the Australian Institute of Radio and Electronic Engineers during 1971.

Alternative forms of fault path isolator may be used if required, for instance a circuit breaker might be inserted in each path, or the current flow might be made high enough to blow a transistor. The fuse has the advantages however that it is cheap, simple and highly reliable.

A further possibility is the use of amorphous semiconductors instead of thin-film fuses. Such elements would change state upon receiving the disabling signal and in the changed state would prevent passage of the normal signal. In this case the possibility arises of returning the element to its "normal" state, in which it permits passage of the normal signal, by application of a suitable further signal to the path.

I claim:

1. An apparatus for use in control of a system which includes a plurality of conditionable paths each having a first condition which permits the path to carry a normal signal and a second condition which does not permit it to carry such a signal, the paths being such that in normal use they can be placed in their second conditions by a control, said improvement comprising: disabling means actuable, when all controllable ones of said paths have been placed in their second conditions, for rendering any other of said paths still in its first condition at least temporarily incapable of carrying said normal signal.

2. Apparatus according to claim 1, in which each path includes a corresponding means for permitting such path when in its first condition to carry a normal signal and a disabling signal and for preventing such path when in its second condition from carrying either of those signals, the disabling means comprising first means coupled to said paths and operable for causing any path in its first condition to carry the disabling signal, and a plurality of second means associated with respective paths and each responsive to presence of the disabling signal on the associated path for rendering that path at least temporarily incapable of carrying said normal signal.

3. Apparatus as claimed in claim 2 including means for sensing a fault condition of the system, such fault being that control of one of the paths has been lost with that path in its first condition, and in which said first means is responsive to sensing of such a fault.

4. Apparatus as claimed in claim 3, wherein the system is such that adoption of the first condition by any one of the paths automatically causes the normal signal to appear on that path, the means for sensing the fault condition comprising means to cause all controllable paths to adopt their second conditions, and for sensing the presence of the normal signal on a fault path while the controllable paths are in said second conditions.

5. Apparatus as claimed in claim 2 wherein the plurality of second means comprises a plurality of fuses, one in each path, and the disabling signal is a current flow supplied by said first means and sufficient to blow the fuses, said normal signal being supplied other than by said first means.

6. Apparatus as claimed in claim 1 and including means to apply a test signal successively to the paths, so that each path can be ordered into its first condition by the control when the test signal is applied thereto, the test signal thereby being detected on the controllable paths, but not on a path rendered incapable of carrying the normal signal.

7. A system comprising a plurality of conditionable paths each having a first condition which permits the path to carry a normal signal and a second condition which does not permit it to carry such a signal, a control which in normal use can place the paths in their second conditions, and disabling means actuable when all controllable ones of said paths have been placed in their second conditions by the control for rendering any other of said path still in its first condition at least temporarily incapable of carrying said normal signal.

8. A method for controlling a system which includes a plurality of conditionable paths each having a first condition which permits the path to carry a normal signal and a disabling signal and a second condition which does not permit it to carry either of said signals, such that in normal use all paths can be placed in their second conditions by a control, comprising the steps of providing a plurality of means associated with respective paths and each responsive to the presence of the disabling signal on the associated path to render that path at least temporarily incapable of carrying said normal signal, and placing each path in communication with a disabling signal source while causing all controllable paths to adopt their second conditions.

9. Apparatus according to claim 7, in which each path includes at one end thereof gating means having a first input from said control and a second input for said normal signal and responsive to simultaneous actuation of both said inputs for initiating said first condition and causing the corresponding path to carry said normal signal, said gating means each including switch means providing a connection to ground in response to said simultaneous actuation, said system further including a common data highway connected at one end to the other end of each of said paths and a receiver connected to the other end of said data highway, said system further including source means connected to said data highway for causing current flow through said data highway and a connected one of said paths switched to ground, said disabling means including current interrupting means in each of said path responsive to a disabling signal for interrupting said path but capable of carrying current flow from said source means to said switching means of the associated gating device of said path, said disabling means further including executioner means selectively actuable in response to signal transfer along a given path when such given path is intended to be in its second condition for applying to said path said disabling signal.

10. A system comprising:
a plurality of conditionable paths, each having a first condition which permits the path to carry a normal signal and a second condition which does not permit it to carry such a normal signal;
a gating means at one end of each path having a link input and a control input and responsive to simultaneous actuation of both said inputs for placing the corresponding path in said first condition and causing said corresponding path to carry said normal signal, each said gating means including switch means for connecting said one end of the corresponding path to ground in response to said simultaneous actuation;
a common data highway connected at one end to the other ends of said paths;
a receiver connected to the other end of said data highway;
source means connected to said data highway for causing current flow to said data highway and a connected one of said paths switched to ground;
disabling means operable when all controllable ones of said paths have been placed in their second conditions for rendering any one of said paths still in its first condition at least temporarily incapable of carrying said normal signal, said disabling means including a current interrupting means in each said path responsive to a disabling signal for interrupting said path but capable of carrying current flow from said source means to said switching means of the associated gating device of said path, said disabling means further including executioner means selectively actuable when all paths are intended to be in their second condition for applying to any current carrying path said disabling signal, said disabling signal comprising a current exceeding current flow from said source means.

* * * * *

UNITED STATES PATENT OFFICE
CERTIFICATE OF CORRECTION

Patent No. 3 745 418     Dated July 10, 1973

Inventor(s) Norman William McLeod

It is certified that error appears in the above-identified patent and that said Letters Patent are hereby corrected as shown below:

Column 4, line 24; change "An" to ---In---.

Column 6, line 4; change "switching" to ---switch---.

Column 6, line 4; change "device" to ---means---.

Column 6, line 39; change "switching" to ---switch---.

Column 6, line 40; change "device" to ---means---.

Signed and sealed this 6th day of August 1974.

(SEAL)
Attest:

McCOY M. GIBSON, JR.            C. MARSHALL DANN
Attesting Officer               Commissioner of Patents